(12) United States Patent
Zhang et al.

(10) Patent No.: US 10,879,801 B2
(45) Date of Patent: Dec. 29, 2020

(54) POWER CONVERTER WITH A PLURALITY OF SWITCHING POWER STAGE CIRCUITS

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/429,193

(22) Filed: Jun. 3, 2019

(65) Prior Publication Data

US 2019/0386566 A1 Dec. 19, 2019

(30) Foreign Application Priority Data

Jun. 14, 2018 (CN) .......................... 2018 1 0612057

(51) Int. Cl.
*H02M 3/158* (2006.01)
*H02M 1/088* (2006.01)
*H02M 1/15* (2006.01)

(52) U.S. Cl.
CPC ........... *H02M 3/158* (2013.01); *H02M 1/088* (2013.01); *H02M 1/15* (2013.01)

(58) Field of Classification Search
CPC ......... H02M 3/158; H02M 1/088; H02M 1/15
See application file for complete search history.

(56) References Cited

U.S. PATENT DOCUMENTS

| | | |
|---|---|---|
| 5,581,454 A | 12/1996 | Collins |
| 7,696,735 B2 | 4/2010 | Oraw et al. |
| 7,907,429 B2 | 3/2011 | Ramadass et al. |
| 8,427,113 B2 | 4/2013 | King et al. |
| 8,687,382 B2 | 4/2014 | Chen |
| 8,729,819 B2 | 5/2014 | Zhou et al. |
| 8,917,528 B2 | 12/2014 | Xu |
| 9,287,782 B2 | 3/2016 | Chen |
| 9,473,034 B2 | 10/2016 | Huang et al. |
| 9,762,128 B2 | 9/2017 | Zhang et al. |
| 9,853,460 B2 | 12/2017 | Ichikawa et al. |
| 2009/0316443 A1 | 12/2009 | Coccia et al. |

(Continued)

FOREIGN PATENT DOCUMENTS

CN 204696914 U 10/2015

*Primary Examiner* — Jue Zhang
*Assistant Examiner* — Trinh Q Dang
(74) *Attorney, Agent, or Firm* — Michael C. Stephens, Jr.

(57) ABSTRACT

A power converter can include: first and second terminals; N A-type switching power stage circuits, each having a first energy storage element, where N is a positive integer, a first terminal of a first A-type switching power stage circuit in the N A-type switching power stage circuits is coupled to the first terminal of the power converter, and a second terminal of each of the N A-type switching power stage circuits is coupled to the second terminal of the power converter; one B-type switching power stage circuit; and N second energy storage elements, each being coupled to one of the N A-type switching power stage circuits, and the B-type switching power stage circuit is coupled between a terminal of one of the N second energy storage elements corresponding to the B-type switching power stage circuit and the second terminal of the power converter.

20 Claims, 9 Drawing Sheets

(56) References Cited

U.S. PATENT DOCUMENTS

| | | |
|---|---|---|
| 2012/0300519 A1 | 11/2012 | Clemmons et al. |
| 2013/0181620 A1 | 7/2013 | Zhao |
| 2013/0201730 A1 | 8/2013 | Luo |
| 2013/0265016 A1 | 10/2013 | Chang et al. |
| 2015/0097615 A1* | 4/2015 | Barnette ............... H02M 3/00 327/543 |
| 2015/0263634 A1* | 9/2015 | Fu ................... H02M 3/33569 363/21.02 |
| 2016/0056709 A1* | 2/2016 | Khayat ............... H02M 3/1588 323/223 |
| 2016/0344214 A1* | 11/2016 | Petersen ............. H02M 3/158 |
| 2018/0198367 A1 | 7/2018 | Zhang et al. |
| 2019/0190368 A1* | 6/2019 | Rainer ................ H02M 1/15 |
| 2019/0214904 A1* | 7/2019 | Yu ..................... H02M 1/36 |

* cited by examiner

POWER CONVERTER WITH A PLURALITY OF SWITCHING POWER STAGE CIRCUITS

RELATED APPLICATIONS

This application claims the benefit of Chinese Patent Application No. 201810612057.5, filed on Jun. 14, 2018, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Power electronic technology is rapidly being developed to help address energy shortage problems, and in particular a power converter having a high gain is an important element. In some approaches, a cascade connection may be utilized to achieve a high gain of the power converter. However, such an approach may result in a relatively large ripple of an output voltage, and can require a relatively large output capacitance.

In one embodiment, a power converter can include: (i) a first terminal; (ii) a second terminal; (iii) N A-type switching power stage circuits, each having a first energy storage element, where N is a positive integer, a first terminal of a first A-type switching power stage circuit in the N A-type switching power stage circuits is coupled to the first terminal of the power converter, and a second terminal of each of the N A-type switching power stage circuits is coupled to the second terminal of the power converter; (iv) one B-type switching power stage circuit; and (v) N second energy storage elements, where each of the N second energy storage elements is coupled to one of the N A-type switching power stage circuits, and the B-type switching power stage circuit is coupled between a terminal of one of the N second energy storage elements corresponding to the B-type switching power stage circuit and the second terminal of the power converter.

Figure 1:
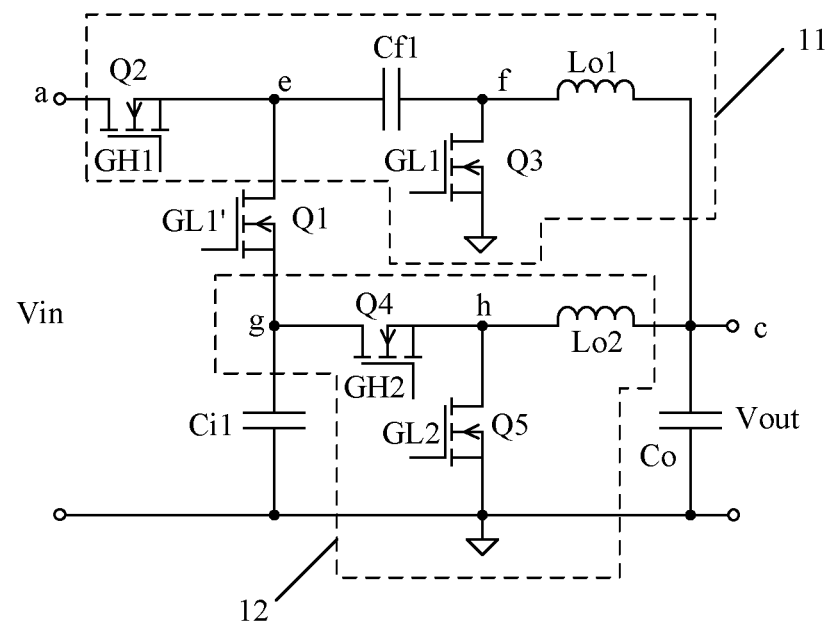
FIG. 1 is a schematic block diagram of a first example power converter, in accordance with embodiments of the present invention.

Referring now to FIG. 1, shown is a schematic block diagram of a first example power converter, in accordance with embodiments of the present invention. In this particular example, the power converter can include A-type switching power stage circuit 11, B-type switching power stage circuit 12, terminal "a," terminal "c," energy storage element Ci1, transistor Q1, and output capacitor Co. In this particular example, terminal a may be configured as an input terminal of the power converter to receive input voltage Vin, and terminal c may be configured as an output terminal of the power converter to generate output voltage Vout.

A first terminal of A-type switching power stage circuit 11 can connect to terminal a, and a second terminal of A-type switching power stage circuit 11 can connect to terminal c. A-type switching power stage circuit 11 can include transistor Q2, transistor Q3, energy storage element Cf1, and magnetic element Lo1. Transistor Q2 can connect between terminals a and e. Energy storage element Cf1 can connect between terminals e and f. Magnetic element Lo1 can connect between terminals f and c. Transistor Q3 can connect between terminal f and a ground terminal. Terminal e is a common node between transistor Q2 and energy storage element Cf1. Terminal f is a common node between energy storage element Cf1 and magnetic element Lo1.

Energy storage element Ci1 can connect to A-type switching power stage circuit 11. Terminal "g" of energy storage element Ci1 can connect to terminal e via transistor Q1 connected in series with energy storage element Ci1, and the other terminal of energy storage element Ci1 can connect to the ground terminal. B-type switching power stage circuit 12 can connect between terminal g of energy storage element Ci1 and terminal c. B-type switching power stage circuit 12 can include transistors Q4 and Q5, and magnetic element Lo2. Transistors Q4 and Q5 can connect between terminal g and the ground terminal. Magnetic element Lo2 can connect between terminals h and c. Terminal h is a common node between transistors Q4 and Q5.

For example, each of transistors Q3 and Q5 is a rectification switch (e.g., a metal-oxide-semiconductor field-effect transistor [MOSFET], a bipolar junction transistor [BJT], and an insulated gate bipolar transistor [IGBT], etc.). In another example, each of transistors Q3 and Q5 may be replaced with a diode. Further, energy storage parameters of energy storage elements Cf1 and Ci1 can be set to control A-type switching power stage circuit 11 to meet inductor volt-second balance (e.g., to control magnetic element Lo1 to be in a stable state). That is, the amount of change in a current of magnetic element Lo1 during a switching period may be controlled to be approximately zero.

Figure 2:
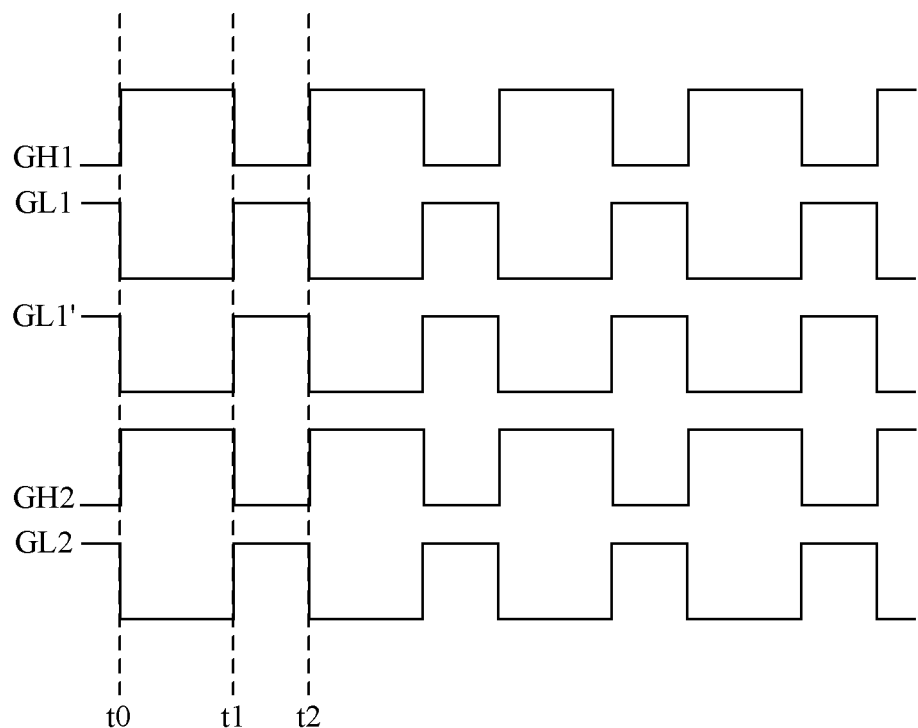
FIG. 2 is a waveform diagram of example operation of the first example power converter, in accordance with embodiments of the present invention.

Referring now to FIG. 2, shown is a waveform diagram of example operation of the first example power converter, in accordance with embodiments of the present invention. In this particular example, the power converter can perform in-phase control on operation states of A-type switching power stage circuit 11 and B-type switching power stage circuit 12. Under the in-phase control, transistor Q2 may have a same switching state as transistor Q4, and transistor Q3 may have a same switching state as transistor Q5, where the switching state of transistor Q2 is complementary to the switching state of transistor Q3. Also, switching control signal GH1 for transistor Q2 may be the same as switching control signal GH2 for transistor Q4 (e.g., transistors Q2 and Q4 have the same switching state and the same duty cycle). Switching control signal GL1 for transistor Q3 may be the same as switching control signal GL2 for transistor Q5. Switching control signal GH1 for transistor Q2 may be complementary to switching control signal GL1 for transistor Q3. Switching control signal GH2 for transistor Q4 may be complementary to the switching control signal GL2 for transistor Q5. Switching control signal GL1' for transistor Q1 may be the same as switching control signal GL1 for transistor Q3. In this case, the power converter can adjust the duty cycle of transistor Q2, in order to adjust output voltage Vout and keep stabilization of output voltage Vout.

The example power converter may have two states during a switching period. In a time period from t0 to t1, switching control signal GH1 for transistor Q2 and switching control signal GH2 for transistor Q4 can be at a high level. In this case, transistors Q2 and Q4 may be turned on, and transistors Q1, Q3, and Q5 turned off. Energy storage element Cf1 may store energy, and the current of magnetic element Lo1 can gradually be increased. Energy storage element Ci1, as a power supply, may supply power to a load via B-type switching power stage circuit 12. A current of magnetic element Lo2 may gradually be increased. In a time period from t1 to t2, switching control signal GH1 for transistor Q2 and switching control signal GH2 for transistor Q4 can be low. In this case, transistors Q2 and Q4 may be turned off, and transistors Q1, Q3, and Q5 can be turned on. The current of magnetic element Lo1 and the current of magnetic element Lo2 may gradually be decreased. Energy storage element Cf1, as a power supply, can charge energy storage element Ci1, and energy storage element Ci1 can store energy. Based on characteristics of the inductor volt-second balance of the A-type switching power stage circuit and the B-type switching power stage circuit, the following relationships may be obtained in formulas (1) and (2).

$$(Vin-Vcf1)*D=Vout \quad (1)$$

$$Vci1*D=Vout \quad (2)$$

Here, Vin represents an input voltage, Vcf1 represents a voltage across energy storage element Cf1, D represents a duty cycle (e.g., a ratio of a conduction time of transistor Q2 to the switching period) of transistor Q2, Vci1 represents a voltage across energy storage element Ci1, and Vout represents an output voltage. It can be seen from FIG. 1 that when switching control signals GL1 and GL1' are at a high level, energy storage element Cf1 may effectively be coupled in parallel with energy storage element Ci1. Thus, the voltage across energy storage element Cf1 may be equal to the voltage across energy storage element Ci1 (e.g., Vcf1=Vci1). Therefore, a relationship between the input voltage and the output voltage of the power converter In this particular example may be expressed as the following formula (3).

$$\frac{Vout}{Vin} = \frac{D}{2} \quad (3)$$

In this particular example, due to the interleaving connection and the in-phase control, the power converter may have relatively a high gain and an adjustable stabilized output voltage, and with relatively simple control.

Figure 3:
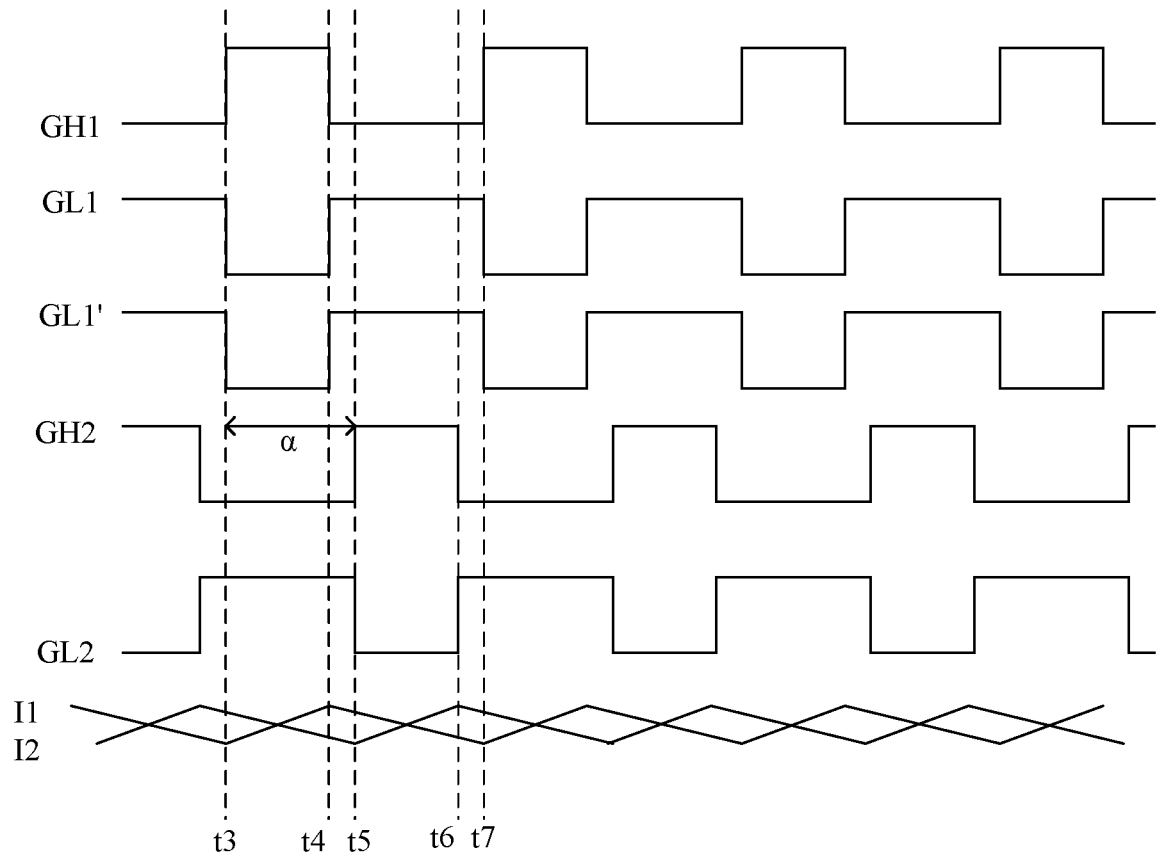
FIG. 3 is another waveform diagram of example operation of the first example power converter, in accordance with embodiments of the present invention.

Referring now to FIG. 3, shown is another waveform diagram of example operation of the first example power converter, in accordance with embodiments of the present invention. In this particular example, the power converter can perform phase-shift control on operation states of A-type switching power stage circuit 11 and B-type switching power stage circuit 12. Under the phase-shift control, conduction timings of transistors Q2 and Q4 have a phase difference α (e.g., 180°). A switching state of transistor Q2 may be complementary to a switching state of transistor Q3. A switching state of transistor Q4 may be complementary to a switching state of transistor Q5. A switching state of transistor Q1 may be the same as the switching state of transistor Q3. Transistors Q2 and Q4 may have a same duty cycle D. In this case, the power converter can adjust duty cycle D (e.g., D<0.5) to adjust output voltage Vout and keep stabilization of output voltage Vout.

In a time period from t3 to t4, switching control signals GH1 and GL2 may be at a high level. In this case, transistors Q2 and Q5 can be turned on, and transistors Q1, Q3, and Q4 may be turned off. Current I1 of magnetic element Lo1 may be increased, and current I2 of magnetic element Lo2 can be decreased. In a time period from t4 to t5, switching control signals GL1, GL1', and GL2 may be at a high level. In this case, transistors Q1, Q3, and Q5 may be turned on, and transistors Q2 and Q4 can be turned off. Current I1 of magnetic element Lo1 may be decreased, and current I2 of magnetic element Lo2 can be decreased. In a time period from t5 to t6, switching control signals GL1, GL1', and GH2 may be at a high level. In this case, transistors Q1, Q3, and Q4 can be turned on, and transistors Q2 and Q5 may be turned off. Current I1 of magnetic element Lo1 may be decreased, and current I2 of magnetic element Lo2 can be increased.

In a time period from t6 to t7, switching control signals GL1, GL1', and GL2 can be at a high level. In this case, transistors Q1, Q3, and Q5 may be turned on, and transistors Q2 and Q4 can be turned off. Current I1 of magnetic element Lo1 may be decreased, and current I2 of magnetic element Lo2 can be decreased. In particular embodiments, due to the interleaving connection and the phase-shift control, the ripple of the output voltage can be reduced, and the required output capacitance can also be reduced. Based on characteristics of the inductor volt-second balance of the A-type switching power stage circuit and the B-type switching power stage circuit, the following relationships may be obtained in formulas (4) and (5).

$$(Vin - Vcf1) * 1) = Vout \tag{4}$$

$$Vci1 * D = Vout \tag{5}$$

Here, Vin represents an input voltage, Vcf1 represents a voltage across energy storage element Cf1, D represents a duty cycle (e.g., a ratio of a conduction time of transistor Q2 to the switching period) of transistor Q2, Vci1 represents a voltage across energy storage element Ci1, and Vout represents an output voltage. It can be seen from FIG. 1 that when switching control signals GL1 and GL1' are at a high level, energy storage element Cf1 can effectively be coupled in parallel to energy storage element Ci1. Thus, the voltage across energy storage element Cf1 may be equal to the voltage across energy storage element Ci1 (e.g., Vcf1=Vci1). Therefore, a relationship between the input voltage and the output voltage of the power converter may be expressed as the following formula (6).

$$\frac{Vout}{Vin} = \frac{D}{2} \tag{6}$$

In this particular example, due to the interleaving connection and the phase-shift control, the ripple of the output voltage can be reduced, and the required output capacitance of output capacitor Co can also be reduced. Further, the power converter may have a relatively high gain and an adjustable stabilized output voltage.

Figure 4:
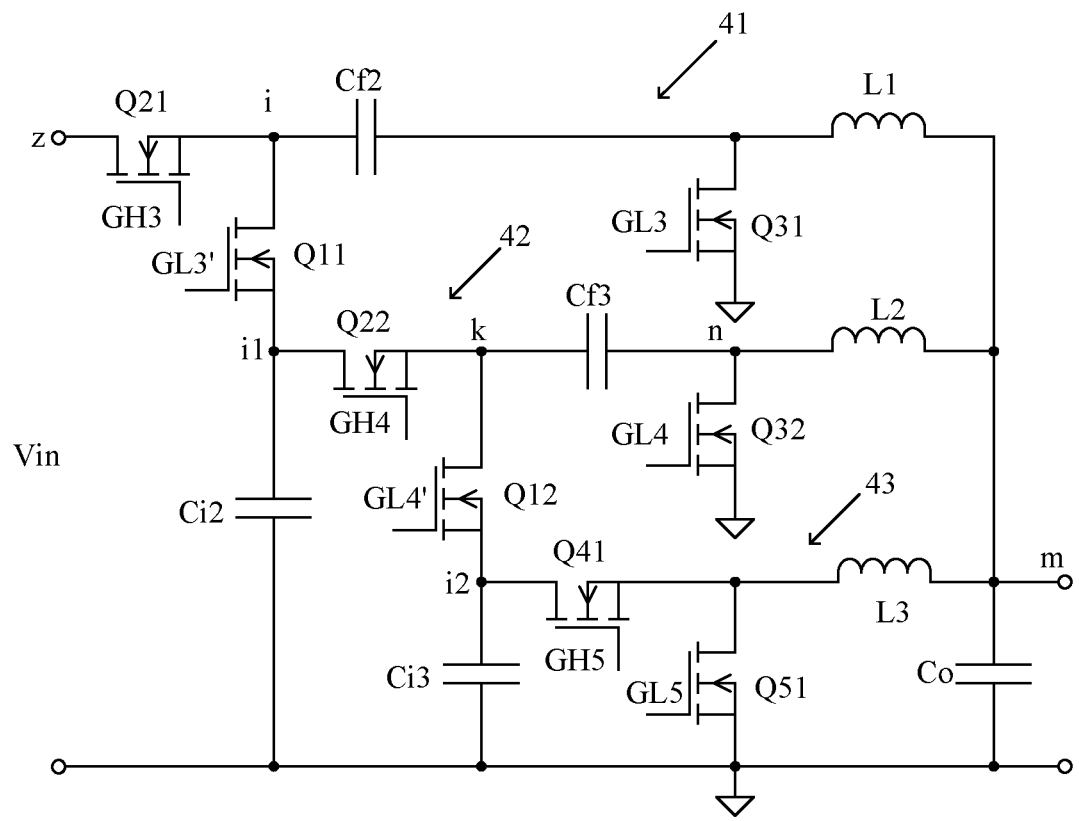
FIG. 4 is a schematic block diagram of a second example power converter, in accordance with embodiments of the present invention.

Referring now to FIG. 4, shown is a schematic block diagram of a second example power converter, in accordance with embodiments of the present invention. In this particular example, the power converter can include A-type switching power stage circuit 41, A-type switching power stage circuit 42, B-type switching power stage circuit 43, terminal z, terminal m, energy storage elements Ci2 and Ci3, transistors Q11 and Q12, and output capacitor Co. In this particular example, terminal z is configured as an input terminal of the power converter to receive input voltage Vin. Terminal m is configured as an output terminal of the power converter to generate output voltage Vout. Energy storage element Ci2 can connect to A-type switching power stage circuit 41. For example, one terminal i1 of energy storage element Ci2 can connect to a common node "i" between transistor Q21 and energy storage element Cf2 via transistor Q11 connected in series with energy storage element Ci2, and the other terminal of energy storage element Ci2 can connect to a ground terminal.

In this particular example, A-type switching power stage circuit 42 can connect between one terminal of energy storage element Ci2 and terminal m (e.g., between terminals i1 and m). A-type switching power stage circuit 42 can include transistors Q22 and Q32, energy storage element Cf3, and magnetic element L2. Transistor Q22 can connect between terminals it and k. Energy storage element Cf3 can connect between terminals k and n. Magnetic element L2 can connect between terminals n and m. Transistor Q32 can connect between terminal n and the ground terminal. Terminal k is a common node between transistor Q22 and energy storage element Cf3. Terminal n is a common node between energy storage element Cf3 and magnetic element L2. A second terminal of A-type switching power stage circuit 41 and a second terminal of A-type switching power stage circuit 42 can connect to terminal m.

Energy storage element Ci3 can connect to A-type switching power stage circuit 42. For example, one terminal i2 of energy storage element Ci3 can connect to common node k between transistor Q22 and energy storage element Cf3 via transistor Q12 connected in series with energy storage element Ci3, and the other terminal of energy storage element Ci3 can connect to the ground terminal. B-type switching power stage circuit 43 can connect between terminal i2 of energy storage element Ci3 and terminal m. For example, each of transistors Q31, Q32, and Q51 is a rectification switch (e.g., a MOSFET, a BJT, an IGBT, etc.). In another embodiment, each of transistors Q31, Q32, and Q51 may be replaced with a diode. Further, energy storage parameters of energy storage elements Cf2 and Cf3, and energy storage elements Ci2 and Ci3 can be set to control A-type switching power stage circuits 41 and 42 to meet inductor volt-second balance (e.g., to control magnetic elements L1 and L2 to be in a stable state). That is, the amount of change in each of currents of magnetic elements L1 and L2 during a switching period may be controlled to be approximately zero.

For example, the power converter can perform in-phase control on operation states of A-type switching power stage circuits 41 and 42, and B-type switching power stage circuit 43. Transistors Q21, Q22, and Q41 may have a same duty cycle D and a same switching state. A switching state of transistor Q31 may be complementary to the switching state of transistor Q21. Transistors Q31, Q32, Q11, Q12, and Q51 may have a same switching state. In this case, the power converter can adjust duty cycle D, in order to adjust output voltage Vout and keep stabilization of output voltage Vout. Based on characteristics of the inductor volt-second balance of A-type switching power stage circuits 41 and 42, and B-type switching power stage circuit 43, the following relationships in formulas (7), (8), and (9) may be obtained.

$$(Vin1 - Vcf2) * D = Vout \tag{7}$$

$$(Vci2 - Vcf3) * D = Vout \tag{8}$$

$$Vci3 * D = Vout \tag{9}$$

Here, Vin represents an input voltage, Vcf2 represents a voltage across energy storage element Cf2, D represents a duty cycle (e.g., a ratio of a conduction time of transistor Q21 to the switching period) of transistor Q21, Vci2 represents a voltage across energy storage element Ci2, Vcf3 represents a voltage across energy storage element Cf3, Vci3 represents a voltage across energy storage element Ci3, and Vout represents an output voltage. It can be seen from FIG. 4 that when switching control signals GL3 and GL3' are high, energy storage element Cf2 can effectively be coupled in parallel to energy storage element Ci2. When switching control signals GL4 and GL4' are high, energy storage element Cf3 can effectively be coupled in parallel to energy storage element Ci3. Thus, the voltage across energy storage element Cf2 may be equal to the voltage across energy storage element Ci2, and the voltage across energy storage element Cf3 is equal to the voltage across energy storage element Ci3 (e.g., Vcf2=Vci2 and Vcf3=Vci3). Therefore, a relationship between the input voltage and the output voltage of the power converter may be expressed as the following formula (10).

$$\frac{Vout}{Vin} = \frac{D}{3} \tag{10}$$

In this particular example, the power converter may have a relatively high gain and an adjustable stabilized output voltage, and with a relatively simple control manner.

Figure 5:
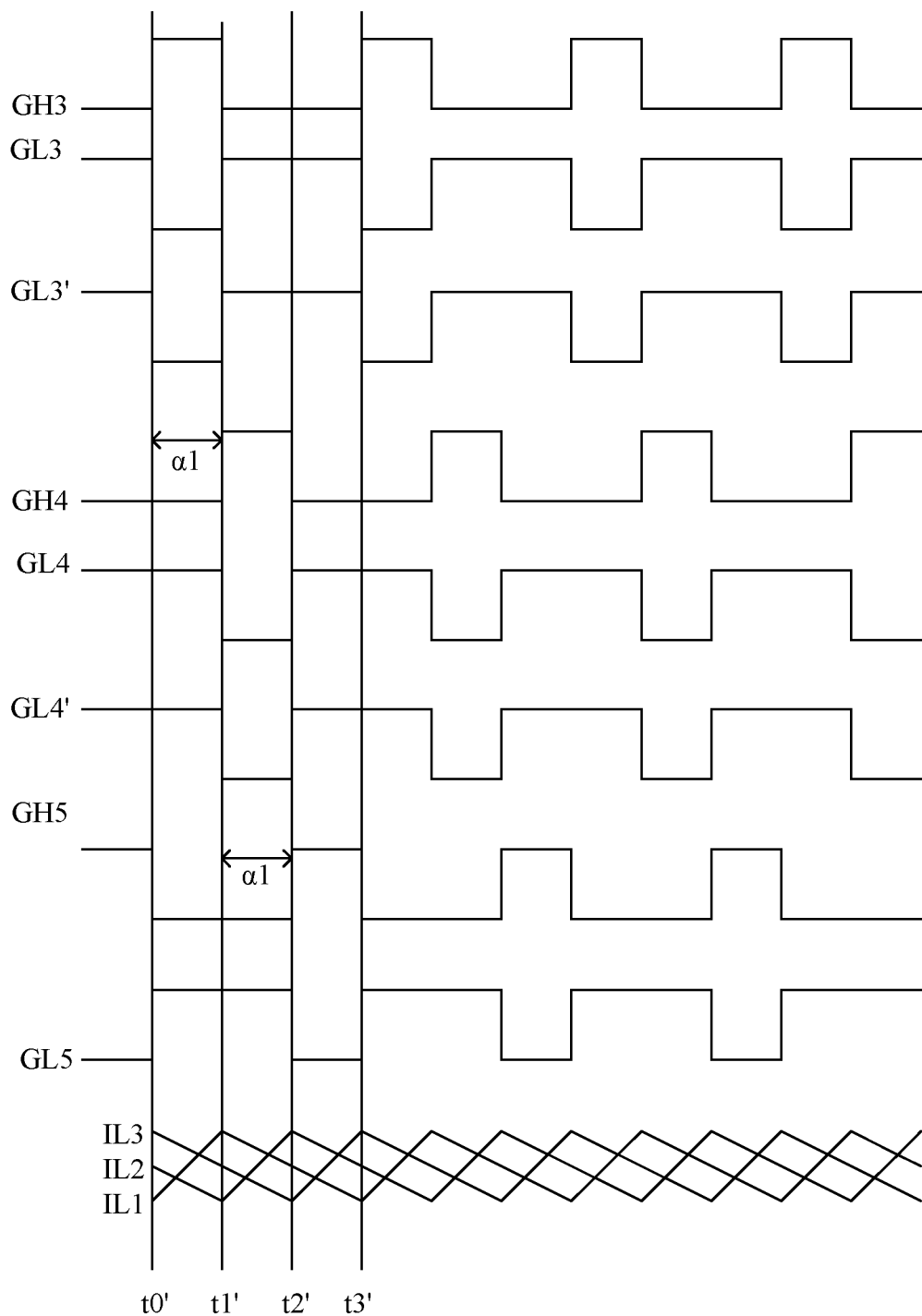
FIG. 5 is a waveform diagram of example operation of the second example power converter, in accordance with embodiments of the present invention.

Referring now to FIG. 5, shown is a waveform diagram of example operation of the second example power converter, in accordance with embodiments of the present invention. In this particular example, the power converter can perform phase-shift control on operation states of A-type switching power stage circuits 41 and 42, and B-type switching power stage circuit 43. Under the phase-shift control with reference to FIG. 4, conduction timings of transistors Q21, Q22, and Q41 may have a same phase difference α1 (e.g., α1 is 120°). A switching state of transistor Q21 may be complementary to a switching state of transistor Q31, a switching state of transistor Q22 may be complementary to a switching state of transistor Q32, and a switching state of transistor Q41 may be complementary to a switching state of transistor Q51. Switching states of transistors Q11 and Q12 may be the same with the switching state of transistor Q31. Also, transistors Q21, Q22, and transistor Q41 may have a same duty cycle D. In this case, the power converter can adjust duty cycle D (e.g., D<0.5), in order to adjust output voltage Vout and keep stabilization of output voltage Vout.

Switching control signals GH3, GH4, GH5, GL3, GL4, GL5, GL3', and GL4' may respectively be used to control transistors Q21, Q22, Q41, Q31, Q32, Q51, Q11, and Q12. In a time period from t0' to t1', switching control signals GH3, GL4, GL4', and GL5 may be at a high level. In this case, transistors Q21, Q32, Q12, and Q51 can be turned on, and transistors Q31, Q11, Q22 and Q41 are turned off. Current IL1 of magnetic element L1 may be increased, and current IL2 of magnetic element L2 and current IL3 of magnetic element L3 can be decreased.

In a time period from t1' to t2', switching control signals GL3, GL3', GH4, and GL5 may be at a high level. In this case, transistors Q31, Q11, Q22, and Q51 can be turned on, and transistors Q21, Q32, Q12, and Q41 may be turned off. Current IL2 of magnetic element L2 may be increased, and current IL1 of magnetic element L1 and current IL3 of magnetic element L3 can be decreased. In a time period from t2' to t3', switching control signals GL3, GL3', GL4, GL4', and GH5 are at a high level. In this case, transistors Q31, Q11, Q32, Q12, and Q41 can be turned on, and transistors Q21, Q22, and Q51 may be turned off. Current IL1 of magnetic element L1 and current IL2 of magnetic element L2 may be decreased, and current IL3 of magnetic element L3 may be increased.

It can be seen from waveform diagrams of current IL1 of magnetic element L1, current IL2 of magnetic element L2, and current IL3 of magnetic element L3 that, due to the interleaving connection and the phase-shift control, the ripple of the output voltage may be reduced, and the required output capacitance can also be reduced. Based on characteristics of the inductor volt-second balance of A-type switching power stage circuits 41 and 42, and B-type switching power stage circuit 43, the following relationships may be obtained in formulas (11), (12), and (13).

$$(Vin - Vcf2) * D = Vout \tag{11}$$

$$(Vci2 - Vcf3) * D = Vout \tag{12}$$

$$Vci3 * D = Vout \tag{13}$$

Here, Vin represents an input voltage, Vcf2 represents a voltage across energy storage element Cf2, D represents a duty cycle (e.g., a ratio of a conduction time of transistor Q21 to the switching period) of transistor Q21, Vci2 represents a voltage across energy storage element Ci2, Vcf3 represents a voltage across energy storage element Cf3, Vci3 represents a voltage across energy storage element Ci3, and Vout represents an output voltage. It can be seen from FIG. 4 that the voltage across energy storage element Cf2 may be equal to the voltage across energy storage element Ci2, and the voltage across energy storage element Cf3 is equal to the voltage across the second energy storage element Ci3 (e.g., Vcf2=Vci2 and Vcf3=Vci3). Therefore, a relationship between the input voltage and the output voltage of the power converter may be expressed as the following formula (14).

$$\frac{Vout}{Vin} = \frac{D}{3} \tag{14}$$

In this particular example, due to the interleaving connection and the phase-shift control, the ripple of the output voltage can be reduced, and the required output capacitance of output capacitor Co can also be reduced. Further, the power converter may have a relatively high gain and an adjustable stabilized output voltage.

Figure 6:
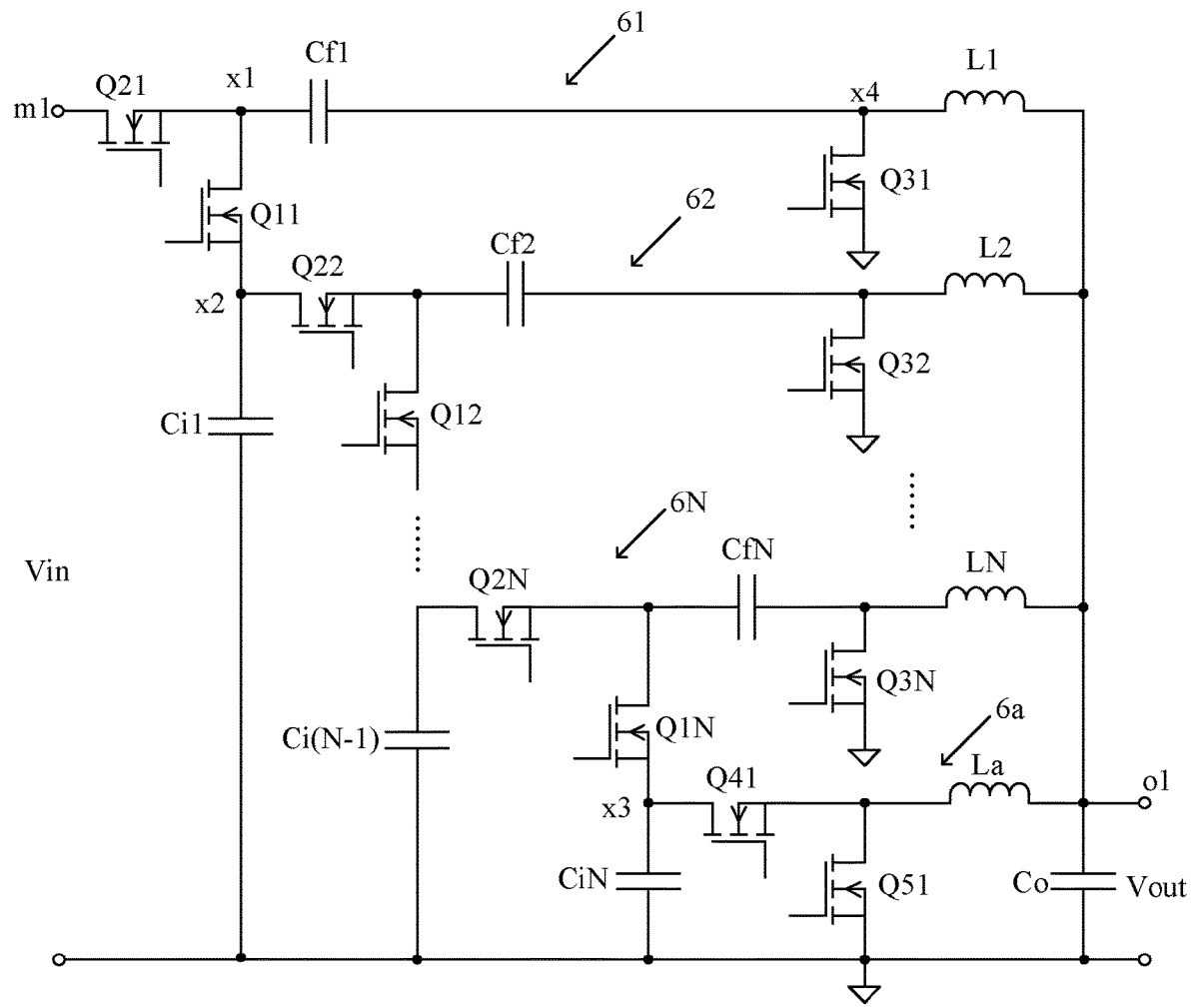
FIG. 6 is a schematic block diagram of a third example power converter, in accordance with embodiments of the present invention.

Referring now to FIG. 6, shown is a schematic block diagram of a third example power converter, in accordance with embodiments of the present invention. In this particular example, the power converter can include N A-type switching power stage circuits 61-6N (e.g., N is a positive integer), one B-type switching power stage circuit 6a, terminal m1, terminal o1, N energy storage elements Ci1-CiN, N transistors Q11-Q1N, and output capacitor Co. In this particular example, terminal m1 may be configured as an input terminal of the power converter to receive input voltage Vin. Terminal o1 can be configured as an output terminal of the power converter to generate output voltage Vout.

As shown in FIG. 6, j-th energy storage element Cij can connect to j-th A-type switching power stage circuit 6j, where j=1, 2, . . . , N. For example, one terminal of j-energy storage element Cij can connect to j-th A-type switching power stage circuit 6j via transistor Q1j connected in series with j-th energy storage element Cij, and the other terminal of j-th energy storage element Cij can connect to a ground terminal. For example, terminal x2 of energy storage element Ci1 can connect to terminal x1 via transistor Q11 connected in series with energy storage element Ci1. A first terminal of A-type switching power stage circuit 61 can connect to the terminal m1, and a second terminal of A-type switching power stage circuit 61 can connect to terminal o1. When N>1, an n-th A-type switching power stage circuit 6n can connect between an (n−1)-th energy storage element Ci(n−1) and terminal o1, where n=2, 3, . . . , N. A second terminal of each of the A-type switching power stage circuits can connect to terminal o1.

The j-th A-type switching power stage circuit 6j can include transistor Q2j, energy storage element Cfj, transistor Q3j, and magnetic element Lj. In the case of j=1, one terminal of transistor Q21 can connect to terminal m1, and the other terminal of transistor Q21 can connect to energy storage element Cf1. Magnetic element L1 can connect between energy storage element Cf1 and terminal o1. Transistor Q31 can connect between the ground terminal and terminal x4, which is a common node between energy storage element Cf1 and magnetic element L1. In the case of j>1, one terminal of transistor Q2j can connect to a common node between transistor Q1(j−1) and energy storage element Ci(j−1), and the other terminal of transistor Q2j can connect to energy storage element Cfj. Magnetic element Lj can connect between energy storage element Cfj and terminal o1. Transistor Q3j can connect between a terminal that is a common node between energy storage element Cfj and magnetic element Lj, and the ground terminal.

B-type switching power stage circuit 6a can connect between to terminal x3 of energy storage element CiN and terminal o1. B-type switching power stage circuit 6a can include transistor Q41, transistor Q51, and magnetic element La. For example, each of transistors Q3j and Q51 is a rectification switch (e.g., an MOSFET, a BJT, and IGBT, etc). In another example, each of transistors Q3j and Q51 may be replaced with a diode. Energy storage parameters of energy storage elements Cfj and Cij may be set to control A-type switching power stage circuit 6j to meet inductor volt-second balance (e.g., to control the first magnetic element Lj to be in a stable state). That is, the amount of change in a current of magnetic element Lj during a switching period may be controlled to be approximately zero.

In this particular example, energy storage elements Ci1-CiN, as power supplies, may respectively supply input voltages to the corresponding A-type switching power stage circuits 62-6N and B-type switching power stage circuit 6a. Energy storage element Cfj can charge energy storage element Cij when energy storage element Cfj meets a predetermined condition (e.g., transistor Q1j is turned on). In this particular example, the BUCK topology is used in A-type switching power stage circuits 6j and B-type switching power stage circuit 6a, in order to achieve a high buck ratio. It should be understood that A-type switching power stage circuits 6j and B-type switching power stage circuit 6a may be implemented by using any suitable converter topology (e.g., Boost topology, a Buck topology, a Boost-Buck topology, a Zeta topology, a Sepic topology, a Cuk topology, a flyback converter, a forward converter, a push-pull converter, a half-bridge converter, a full-bridge converter, an LLC converter, etc.) in certain embodiments.

For example, the power converter can perform in-phase control on operation states of A-type switching power stage circuit 6j and B-type switching power stage circuit 6a. Under the in-phase control, transistors Q21-Q2N may have a same switching state as transistor Q41, and transistors Q31-Q3N may have a same switching state as transistors Q11-Q1N, and transistor Q51, where a switching state of the transistor Q2j may be complementary to a switching state of transistor Q3j. Transistors Q21-Q2N and transistor Q41 may have a same duty cycle. In this case, the power converter can adjust the duty cycle of transistor Q21, in order to adjust the output voltage Vout and keep stabilization of output voltage Vout. Based on characteristics of the inductor volt-second balance of A-type switching power stage circuits 61-6N and B-type switching power stage circuit 6a, the following relationships may be obtained in formulas (15), (16), (17), and (18).

$$(V\text{in}-V\text{cf1})*D=V\text{out} \qquad (15)$$

$$(V\text{ci1}-V\text{cf2})*D=V\text{out} \qquad (16)$$

$$(V\text{ci}(N-1)-V\text{cfN})*D=V\text{out} \qquad (17)$$

$$V\text{ciN}*D=V\text{out} \qquad (18)$$

Here, Vin represents an input voltage, Vcf1 represents a voltage across energy storage element Cf1, D represents a duty cycle (e.g., a ratio of a conduction time of transistor Q21 to the switching period) of transistor Q21, Vci1 represents a voltage across energy storage element Ci1, Vcf2 represents a voltage across energy storage element Cf2, Vci(N−1) represents a voltage across energy storage element Ci(N−1), VciN represents a voltage across energy storage element CiN, and Vout represents an output voltage. It can be seen from the connection relationship shown in FIG. 6 that a voltage across energy storage element Cfj may be equal to a voltage across energy storage element Cij (e.g., Vcfj=Vcij). Therefore, a relationship between the input voltage and the output voltage of the power converter may be expressed as the following formula (19).

$$\frac{V\text{out}}{V\text{in}} = \frac{D}{N} \qquad (19)$$

In this particular example, the power converter has a relatively high gain and an adjustable stabilized output voltage, with a relatively simple control manner. In another example, the power converter can perform phase-shift control on operation states of A-type switching power stage circuit 6j and B-type switching power stage circuit 6a. Under the phase-shift control, transistors Q21-Q2N and transistor Q41 may be controlled to have a same phase difference between conduction timings of transistors Q21-Q2N and transistor Q41. For example, the phase difference is 360°/(N+1). A switching state of transistor Q2j may be complementary to a switching state of transistor Q3j, a switching state of transistor Q1j may be the same as the switching state of transistor Q3j, and a switching state of transistor Q41 may be complementary to a switching state of the transistor Q51. Transistors Q21-Q2N and transistor Q41 may have a same duty cycle. In this case, the power converter can adjust the duty cycle of transistor Q21, in order to adjust output voltage Vout and keep stabilization of output voltage Vout.

It can be seen from the above current waveforms, the ripple of the current may be reduced as the number of the A-type switching power stage circuits is increased. Similarly, due to the interleaving connection and the phase-shift control, the ripple of the output voltage can be reduced, and the required output capacitance can also be reduced. An increased number of the A-type switching power stage circuits may correspond to the low ripple of the output voltage, thereby requiring a small output capacitance. Based on characteristics of the inductor volt-second balance of A-type switching power stage circuits 61-6N, and B-type switching power stage circuit 6a, the following relationships of formulas (20), (21), (22), and (23) may be obtained.

$$(V\text{in}-V\text{cf1})*D=V\text{out} \qquad (20)$$

$$(V\text{ci1}-V\text{cf2})*D=V\text{out} \qquad (21)$$

$$(V\text{ci}(N-1)-V\text{cfN})*D=V\text{out} \qquad (22)$$

$$V\text{ciN}*D=V\text{out} \qquad (23)$$

Here, Vin represents input voltage, Vcf1 represents a voltage across energy storage element Cf1, D represents a duty cycle (e.g., a ratio of a conduction time of transistor Q21 to the switching period) of transistor Q21, Vci1 represents a voltage across energy storage element Ci1, Vcf2 represents a voltage across energy storage element Cf2, Vci(N−1) represents a voltage across energy storage element Ci(N−1), VciN represents a voltage across energy storage element CiN, and Vout represents an output voltage. It can be seen from the connection relationship shown in FIG. 6 that a voltage across energy storage element Cfj may be equal to a voltage across energy storage element Cij (e.g., Vcfj=Vcij). Therefore, a relationship between the input voltage and the output voltage of the power converter may be expressed as the following formula (24).

$$\frac{Vout}{Vin} = \frac{D}{N} \tag{24}$$

In this particular example, due to the interleaving connection and the phase-shift control, the ripple of the output voltage can be reduced, and the required output capacitance of output capacitor Co can also be reduced. Further, the power converter may have a relatively high gain and an adjustable stabilized output voltage. An increased number of the A-type switching power stage circuits can correspond to the low ripple of the output voltage and a high gain, thereby requiring a relatively small output capacitance.

Figure 7:
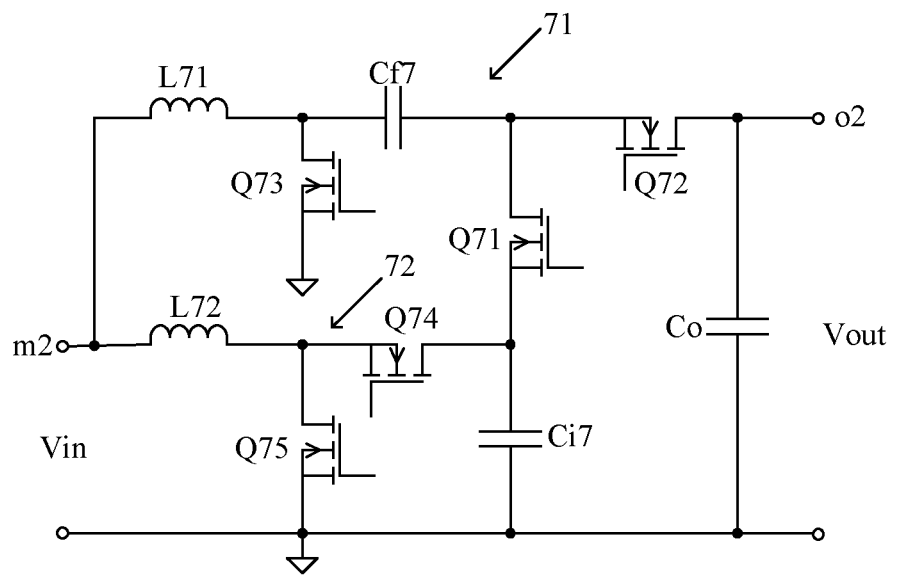
FIG. 7 is a schematic block diagram of a fourth example power converter, in accordance with embodiments of the present invention.

Referring now to FIG. 7, shown is a schematic block diagram of a fourth example power converter, in accordance with embodiments of the present invention. In this particular example, the power converter is a Boost power stage converter. The power converter can include A-type switching power stage circuit 71, B-type switching power stage circuit 72, terminal o2, terminal m2, transistor Q71, energy storage element Ci7, and output capacitor Co. Terminal o2 may be configured as an output terminal of the power converter to generate output voltage Vout, and terminal m2 may be configured as an input terminal of the power converter to receive input voltage Vin. A-type switching power stage circuit 71 can include transistor Q72, energy storage element Cf7, transistor Q73, and magnetic element L71. B-type switching power stage circuit 72 can include transistor Q74, transistor Q75, and magnetic element L72. For example, each of transistors Q73 and Q75 is a rectification switch (e.g., a MOSFET, a BJT, and IGBT, etc.). In another embodiment, each of transistors Q73 and Q75 may be replaced with a diode. Energy storage parameters of energy storage elements Cf7 and Ci7 may be set to control A-type switching power stage circuit 71 to meet inductor volt-second balance (e.g., to control magnetic element L71 to be in a stable state). That is, the amount of change in a current of magnetic element L71 during a switching period may be controlled to be approximately zero.

For example, the power converter can perform in-phase control on operation states of A-type switching power stage circuit 71 and B-type switching power stage circuit 72. Under the in-phase control, transistor Q72 may have a same switching state as transistor Q74, and transistor Q71 may have a same switching state as transistor Q73, where the switching state of transistor Q72 is complementary to the switching state of transistor Q73. Transistors Q72 and Q74 may have a same duty cycle D. In this case, the power converter can adjust the duty cycle D, to adjust output voltage Vout and keep stabilization of output voltage Vout.

Based on characteristics of the inductor volt-second balance of the A-type switching power stage circuit and the B-type switching power stage circuit, the following relationships of formulas (25) and (26) may be obtained.

$$Vin=(1-D)*(Vout-Vcf7) \tag{25}$$

$$Vin=(1-D)*Vci7 \tag{26}$$

Here, Vin represents an input voltage, Vcf7 represents a voltage across energy storage element Cf7, D represents a duty cycle (e.g., a ratio of a conduction time length of transistor Q72 to the switching period) of transistor Q72, Vci7 represents a voltage across energy storage element Ci7, and Vout represents an output voltage. It can be seen from the connection relationship shown in FIG. 7 that the voltage across energy storage element Cf7 may be equal to the voltage across energy storage element Ci7 (e.g., Vcf7=Vci7). Therefore, a relationship between the input voltage and the output voltage of the power converter may be expressed as the following formula (27).

$$\frac{Vout}{Vin} = \frac{2}{1-D} \tag{27}$$

In this particular example, due to the interleaving connection and the in-phase control, the power converter may have a relatively high gain and an adjustable stabilized output voltage, and with a relatively simple control manner. In another example, the power converter may perform phase-shift control on operation states of A-type switching power stage circuit 71 and B-type switching power stage circuit 72. Under the phase-shift control, transistors Q72 and Q74 can be controlled to have a phase difference α (e.g., α is 180°) between conduction timings of transistors Q72 and Q74. A switching state of transistor Q72 may be complementary to a switching state of transistor Q73, a switching state of transistor Q71 may be the same as the switching state of transistor Q73, and a switching state of transistor Q74 may be complementary to a switching state of transistor Q75. Transistors Q72 and Q74 may have a same duty cycle D. In this case, the power converter can adjust the duty cycle D, in order to adjust output voltage Vout and keep stabilization of output voltage Vout.

In this particular example, due to the interleaving connection and the phase-shift control, the ripple of the output voltage can be reduced, and the required output capacitance of output capacitor Co can also be reduced. Further, the power converter may have a relatively high gain and an adjustable stabilized output voltage. It should be understood that the power converter may include N A-type switching power stage circuits, one B-type switching power stage circuit, and N "second" energy storage elements. Based on characteristics of the inductor volt-second balance of the A-type switching power stage circuit and the B-type switching power stage circuit and the above description, a relationship between the input voltage and the output voltage of the power converter may be obtained as below in formula (28).

$$\frac{Vout}{Vin} = \frac{N}{1-D} \tag{28}$$

In this particular example, due to the interleaving connection and the phase-shift control, the ripple of the output voltage can be reduced, and the required output capacitance of output capacitor Co can also be reduced. Further, the power converter may have a relatively high gain and an adjustable stabilized output voltage. An increased number of the A-type switching power stage circuits can correspond to the low ripple of the output voltage and a high gain, thereby requiring a small output capacitance.

Figure 8:
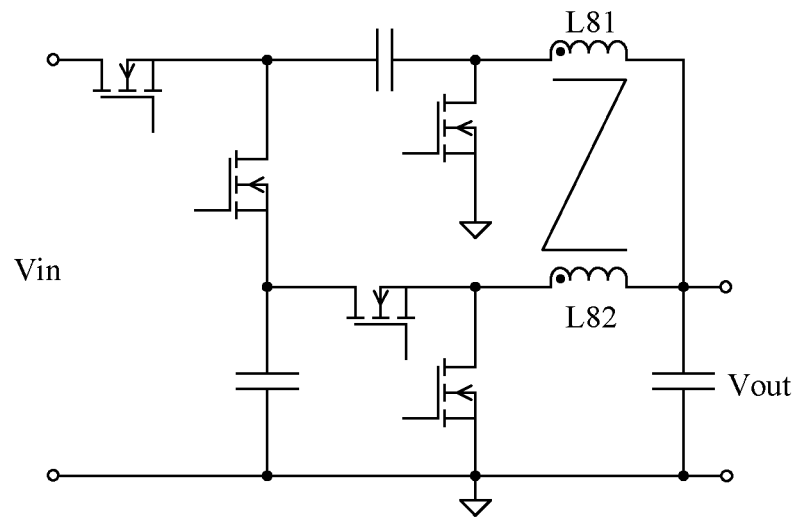
FIG. 8 is a schematic block diagram of a fifth example power converter, in accordance with embodiments of the present invention.

Referring now to FIG. 8, shown is a schematic block diagram of a fifth example power converter, in accordance with embodiments of the present invention. In this particular example, the power converter can include one A-type switching power stage circuit and one B-type switching power stage circuit. In this particular example, magnetic elements L81 and L82 can be coupled with each other, while the ripple of the output voltage and the required output capacitance of output capacitor Co can be further reduced.

Figure 9:
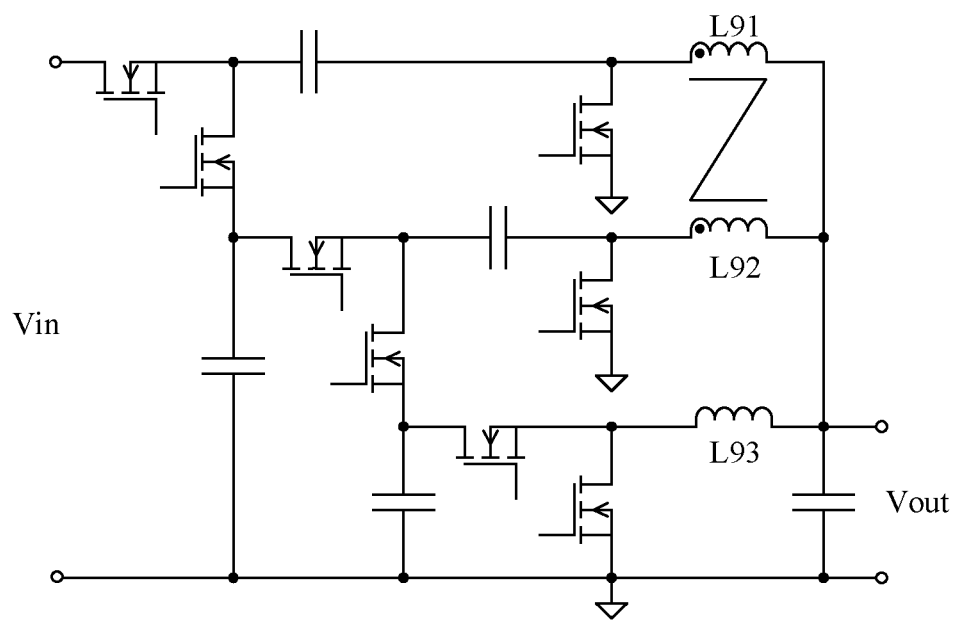
FIG. 9 is a schematic block diagram of a sixth example power converter, in accordance with embodiments of the present invention.

Referring now to FIG. 9, shown is a schematic block diagram of a sixth example power converter, in accordance with embodiments of the present invention. In this particular example, the power converter can include two A-type switching power stage circuits and one B-type switching power stage circuit. In this particular example, magnetic elements L91 and L92 can be coupled with each other, while the ripple of the output voltage can be further reduced and the required output capacitance of output capacitor Co can also be further reduced. In particular embodiments, the power converter can include N A-type switching power stage circuits and one B-type switching power stage circuit. At least one of magnetic elements L91 and L93 can be coupled with magnetic element L92, or at least two of magnetic elements L91 and L93 can be coupled with each other. In this way, the ripple of the output voltage and the required output capacitance can be further reduced.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. A power converter, comprising:
a) a first terminal;
b) a second terminal;
c) N A-type switching power stage circuits, each having a first energy storage element and a first magnetic element that are connected together without a switch, wherein N is a positive integer, wherein a first terminal of a first A-type switching power stage circuit in the N A-type switching power stage circuits is coupled to the first terminal of the power converter, and a second terminal of each of the N A-type switching power stage circuits is coupled to the second terminal of the power converter;
d) one B-type switching power stage circuit; and
e) N second energy storage elements, wherein each of the N second energy storage elements is directly connected to ground and coupled to one of the N A-type switching power stage circuits, and wherein the B-type switching power stage circuit is coupled between a terminal of one of the N second energy storage elements corresponding to the B-type switching power stage circuit and the second terminal of the power converter.

2. The power converter of claim 1, wherein energy storage parameters of first energy storage elements of the N A-type switching power stage circuits and the N second energy storage elements are configured to control the N A-type switching power stage circuits to meet inductor volt-second balance.

3. The power converter of claim 1, wherein when N is greater than 1, an n-th A-type switching power stage circuit from the N A-type switching power stage circuits is coupled between a terminal of an (n-1)-th second energy storage element among the N second energy storage elements and the second terminal of the power converter, and a j-th second energy storage element from the N second energy storage elements is coupled between a j-th A-type switching power stage circuit among the N A-type switching power stage circuits, and a ground, wherein n is a positive integer of at least two, and is a positive integer.

4. The power converter of claim 1, further comprising N first transistors, wherein each of the N second energy storage elements is coupled to the A-type switching power stage circuit corresponding to the second energy storage element via one of the N first transistors connected in series with the second energy storage element.

5. The power converter of claim 1, wherein:
a) the first terminal of the power converter is configured as an input terminal of the power converter to receive an input voltage; and
b) the second terminal of the power converter is configured as an output terminal of the power converter to generate an output voltage.

6. The power converter of claim 1, wherein:
a) the second terminal of the power converter is configured as an input terminal of the power converter to receive an input voltage; and
b) the first terminal of the power converter is configured as an output terminal of the power converter to generate an output voltage.

7. The power converter of claim 4, wherein each of the N A-type switching power stage circuits further comprises a second transistor coupled between a first terminal of the A-type switching power stage circuit and the first energy storage element.

8. The power converter of claim 7, wherein each of the N A-type switching power stage circuits further comprises:
a) a third transistor coupled between the first energy storage element and ground; and
b) wherein the first magnetic element is connected between the first energy storage element and the second terminal of the power converter.

9. The power converter of claim 8, wherein the B-type switching power stage circuit comprises:
a) fourth and fifth transistors coupled between the second energy storage element corresponding to the B-type switching power stage circuit and ground; and
b) a second magnetic element coupled between the second terminal of the power converter and a common node between the fourth and fifth transistors.

10. The power converter of claim 9, wherein phase-shift control is performed on operation states of the N A-type switching power stage circuits and the B-type switching power stage circuit.

11. The power converter of claim 9, wherein in-phase control is performed on operation states of the N A-type switching power stage circuits and the B-type switching power stage circuit.

12. The power converter of claim 9, wherein each of the third and fifth transistors comprises a rectification switch.

13. The power converter of claim 9, wherein each of the third and fifth transistors comprises a diode.

14. The power converter of claim 9, wherein:
a) at least one of first magnetic elements of the N A-type switching power stage circuits is coupled with the second magnetic element; and
b) at least two of first magnetic elements of the N A-type switching power stage circuits are coupled with each other.

15. The power converter of claim 9, wherein at least one of first magnetic elements of the N A-type switching power stage circuits is coupled with the second magnetic element.

16. The power converter of claim 9, wherein at least two of first magnetic elements of the N A-type switching power stage circuits are coupled with each other.

17. The power converter of claim 10, wherein:
a) the second transistor of each of the N A-type switching power stage circuits has a same duty cycle as the fourth transistor;
b) a switching state of the second transistor is complementary to a switching state of the third transistor;
c) a switching state of the fourth transistor is complementary to a switching state of the fifth transistor;
d) a switching state of a j-th first transistor from the N first transistors is complementary to a switching state of a third transistor of a j-th A-type switching power stage circuit from the N A-type switching power stage circuits, wherein j is a positive integer; and
e) the power converter is configured to adjust the duty cycle of the second transistor to generate a stabilized output voltage.

18. The power converter of claim 11, wherein:
a) the second transistor of each of the N A-type switching power stage circuits has a same switching state as the fourth transistor;
b) the third transistor of each of the N A-type switching power stage circuits has a same switching state as the N first transistors and the fifth transistor, and the switching state of the third transistor is complementary to a switching state of the second transistor; and
c) the power converter is configured to adjusting a duty cycle of the second transistor to generate a stabilized output voltage.

19. The power converter of claim 17, wherein when N is greater than 1, there is a same phase difference between conduction timings of adjacent second transistors among the N second transistors, and the same phase difference between a conduction timing of an N-th second transistor among the N second transistors and a conduction timing of the fourth transistor.

20. The power converter of claim 19, wherein the phase difference is 360°/(N+1).

* * * * *